No. 616,630. Patented Dec. 27, 1898.
J. C. PRATT.
PULLEY FOR POWER TRANSMISSION.
(Application filed Dec. 14, 1897.)
(No Model.) 2 Sheets—Sheet 1.
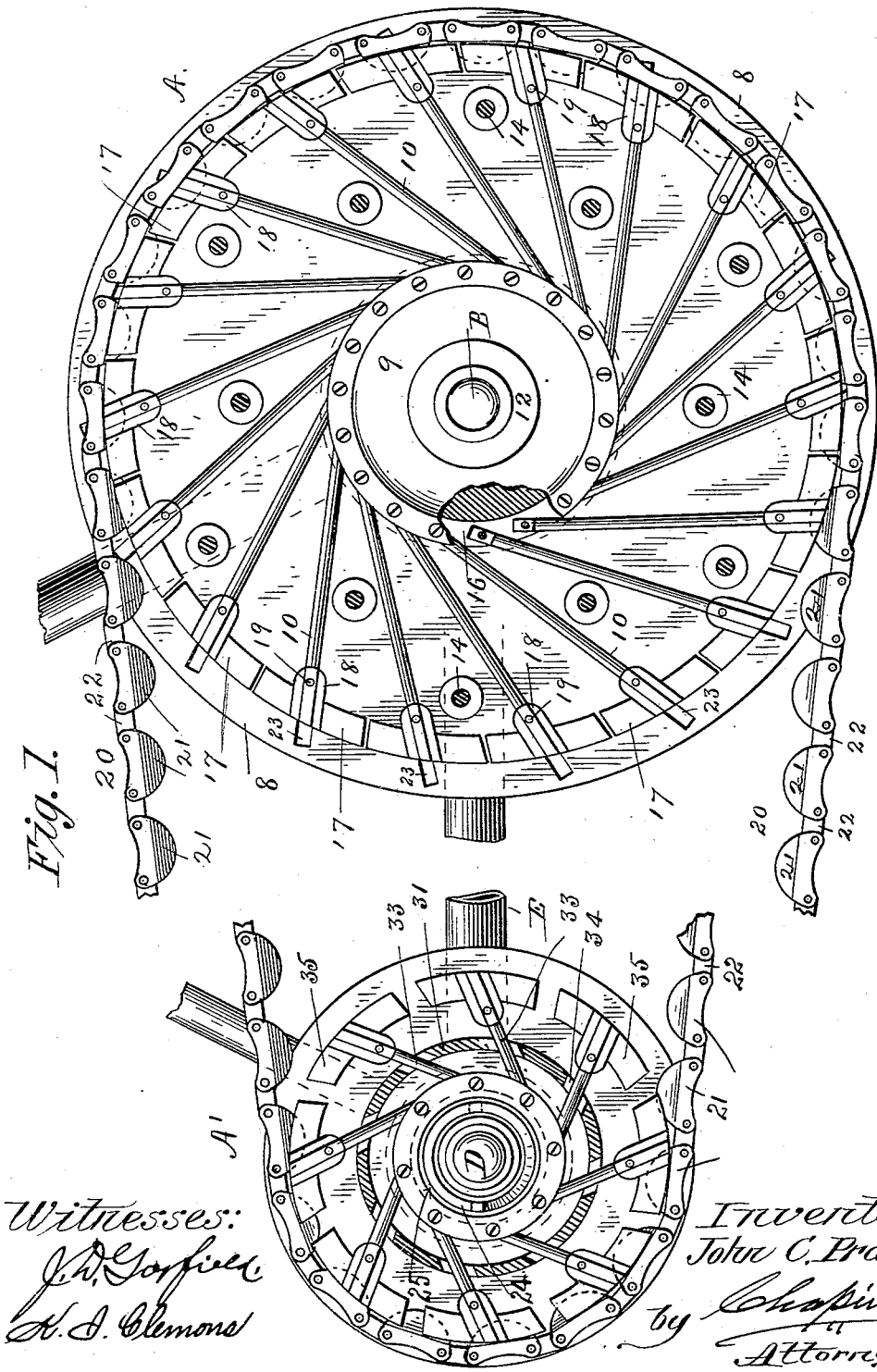
Witnesses:
Inventor,
John C. Pratt,
by
Attorneys.

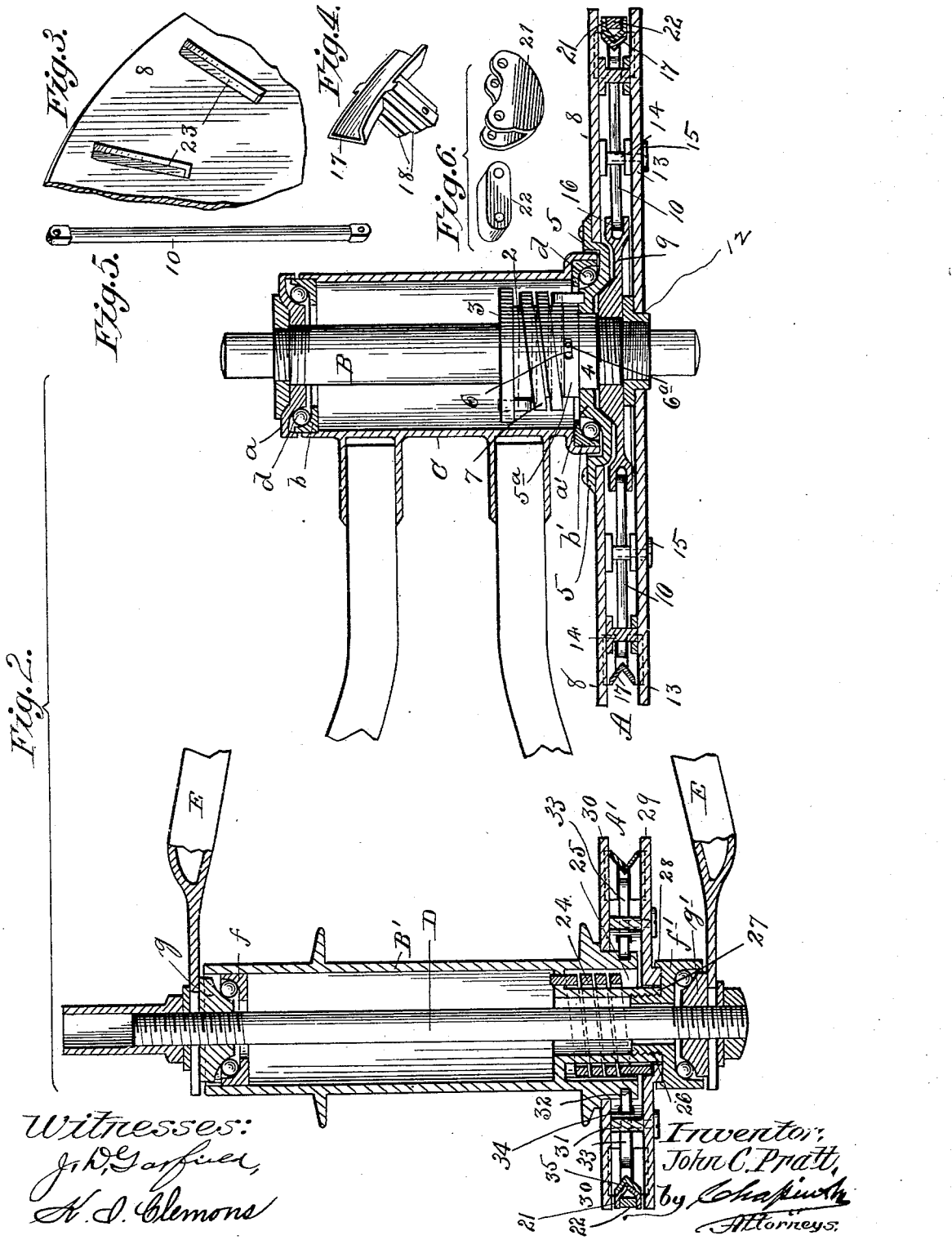

UNITED STATES PATENT OFFICE.

JOHN C. PRATT, OF HARTFORD, CONNECTICUT.

PULLEY FOR POWER TRANSMISSION.

SPECIFICATION forming part of Letters Patent No. 616,630, dated December 27, 1898.

Application filed December 14, 1897. Serial No. 661,796. (No model.)

*To all whom it may concern:*

Be it known that I, JOHN C. PRATT, a citizen of the United States of America, residing at Hartford, in the county of Hartford and State of Connecticut, have invented new and useful Improvements in Pulleys for Power Transmission, of which the following is a specification.

This invention relates to power transmission, and has for its object the construction of a pulley or drive-wheel for transmitting rotary movements from one shaft to another, whereby said pulley shall automatically vary its diameter coincidently with any variation of the load on said pulley—that is to say, in the case of driving-pulleys as the load increases the diameter of the pulley is caused to decrease, or in the case of a driven pulley as the load increases its diameter is caused to increase.

In the drawings forming part of this specification, Figure 1 represents a driving and a driven pulley, in side elevation, constructed according to my invention, each of said pulleys having a side plate removed. Fig. 2 is a longitudinal section, in plan view, of the parts shown in Fig. 1. Fig. 3 is a perspective view of a part of one of the side plates of a pulley. Fig. 4 is a perspective view of one of the segment-shaped shoes forming part of the periphery of a pulley. Fig. 5 represents a spoke of the pulley, and Fig. 6 is a perspective view of parts constituting the flexible driving connection running on the pulleys shown in Fig. 1.

The pulley construction to be described herein is applicable to pulleys for use in every way as ordinary pulleys are used, either driving or driven; but to more clearly illustrate the invention both a driving and a driven pulley are shown in a relation wherein they act conjointly, and an illustration of the pulleys in this relation is suggested in their adaptation to bicycle constructions, and they are shown in the accompanying drawings applied to that vehicle for transmitting power from the crank-axle to the driving-wheel thereof.

Fig. 1 shows a driving-pulley A secured to the crank-axle B of a bicycle and a driven pulley A', of smaller diameter, secured to the hub B' of the driving-wheel of the vehicle.

C represents the crank-hanger of a bicycle-frame; D, the rear-hub axle; E, the rear-hub horizontal braces between the crank-hanger and said rear hub.

The crank-hanger is provided with the usual cones $a\ a'$ and ball-cups $b\ b'$, between which the balls $d$ are located, all in principle like the ordinary constructions of this class, except that the parts in one end of said crank-hanger are adapted to the peculiar construction of the driving-pulley A. Referring to the hub B' of the rear wheel, the same is true. The ball-cup $f$ in one end of said hub and the cones $g\ g'$ are of the usual construction; but the cup $f'$ is adapted to the somewhat changed construction of the hub at the end on which the driven pulley A' is located.

Referring to Fig. 2, it is seen that the crank-axle B has fixed thereon or made integral therewith the collar 2, located within the crank-hanger and having on its inner end a flange 3. The diameter of said crank-axle B at the point where said collar is located is increased somewhat, and said increased diameter is carried somewhat beyond the outer end of said collar 2, as indicated by 4, and on this part of the axle is located the circular plate 5, on which is the cone $a'$. The said enlargement of the axle projects somewhat beyond the face of the plate 5, the purpose of which will be described farther on. Said plate 5 has a hub $5^a$ thereon of the same diameter as the collar 2 and lies in contact therewith, and in said hub is an elongated slot 6, into which a pin $6^a$, fixed in the axle B, enters. The plate 5 has a rotary movement on the crank-axle within the limits of this slot.

In Fig. 2 of the drawings the plate 5 is shown in section, and its hub is shown in full lines, as though it were a separate piece; but the parts are thus illustrated for the purpose of showing the slot 6 in the hub $5^a$.

A spring 7 is coiled about the collar 2, and one end thereof is fixed in the flange 3 of said collar, and the opposite end thereof is fixed in the plate 5. A disk 8, forming one of the sides of the driving-pulley A, has its center punched out to fit over the plate 5, as shown in Fig. 2, to which it is secured by screws $8^a$ or by any other suitable method; or, if preferred, said plate 5 and the disk 8 may be made in one piece; but it would be an impracticable method of construction, as the cone $a'$ on said plate 5 should be hardened, whereas the disk 8 should not be.

As stated, the enlarged part 4 of the axle B extends somewhat beyond the face of the plate 5, to the end that the hub 9, which receives the inner ends of the spokes 10, may be screwed up against the end of said enlarged part 4 and rigidly secured to the axle by a check-nut 12. A disk 13, of the same diameter as disk 8, is secured to the latter in a position parallel therewith by the studs 14, located between them and secured on disk 8, screws 15 passing through said disk 13 and into the ends of the studs securing them together. These two disks rotate as one and are rotatable on the crank-axle B, being connected thereto through the spring 7, one end of which, as stated, enters the plate 5 and the opposite end of which enters the flange 3 on the collar 2. Said spring is coiled around said collar out of contact therewith, to the end that one end thereof may be moved in the direction of the other, and the tension of said spring is such that under a normal load the pulley A will be rotated by the axle B through the spring 7, which connects them, without relative change of position of the two ends of the spring 7 one to the other. Hence under normal conditions the pulley A, the hub 9, and the axle B will all rotate as one piece; but if a load in excess of the tensional resistance of the spring 7 is put upon the periphery of the pulley A then the pulley will be retarded in its rotary movement and the hub 9, fixed on the axle, will be rotated ahead of the pulley within limits imposed by the length of the slot 6 in the hub $5^a$ of the plate 5.

As hereinbefore stated, the inner ends of the spokes 10 are pivotally secured in the edge of the hub 9 in a groove 16 turned in the latter, and to the outer extremities of said spokes are pivotally secured the segment-shaped peripheral sections 17, which constitute the expanding and contracting periphery of the driving-pulley A. Said sections are provided with short parallel arms 18, between which the spoke 10 enters, and a pin 19 passes through said arms and spoke, leaving said piece free to swing on the end of said spoke. Said arms 18 are so located relative to the segmental part thereof that when the spokes are in their operative position they will be in line with said arms. Said sections 17 are provided with a V-shaped groove in their outer surface for the reception of a flexible driving connection 20, made, preferably, in the form of a link belt, as shown, having links 21, V-shaped in cross-section, for engagement with said V-shaped grooves, said links being united by blocks 22 and pins in the usual manner. In the drawings said links 21 are shown made of metal, (see Fig. 6,) though in practice they may be made of any other material or in any other suitable form, and said sections 17 may be provided with a belt-engaging surface having any other suitable form different from the V-shaped groove shown therein; but the form shown was adopted as providing a maximum of frictional surface without unduly increasing the width of the pulley A or its driving connection 20. Said spokes 10 are applied to the hub 9 and pivotally secured thereto in lines substantially tangential to the periphery of said hub, and to support the segmental peripheral sections 17 in proper position relative to each other and to said spokes oppositely-located grooves 23, parallel with said spokes, are made in the inner walls of the disks 8 and 13, (see Figs. 1 and 3,) and projecting portions of the outer surface of the arms 18 enter said grooves, whereby when said driving-pulley A is rotated relative to the hub 9 the peripheral sections 17 constituting the periphery of the pulley will have a movement in said grooves in line with the movement endwise of said spokes.

When the driving-pulley A is rotating under a normal load, the sections 17 will be located near the outer extremities of the grooves 23, with the adjoining ends of said sections separated. As the load increases and the resistance of the spring 7 is overcome the movement of the hub 9 relative to the pulley A imparts to the spokes 10 an endwise movement, thus moving said sections in converging lines toward a common center, thus reducing the driving diameter of the pulley. As soon as the pulley is relieved of the abnormal load the spring 7 causes said peripheral sections to resume their normal positions.

It is obvious that in the application of a driving-pulley having the above-described characteristics its effectiveness may be greatly increased by causing it to be connected with a driven pulley A' which is constructed on the same principle but whose normal diameter is its smallest diameter and which when said pulley meets with a rotational resistance above the normal will expand coincidently with the decrease in the diameter of the driving-pulley. By this combined use of the reversely-acting pulleys any undue slackness of the driving connection 20 is avoided and it requires a smaller degree of peripheral contraction on the part of the driving-pulley to adapt itself to an increased load than would be the case if said driving-pulley were belted directly to a pulley of ordinary construction. The construction of said reversely-acting pulley A' differs in no respect from the construction of the driving-pulley A except that its spring 24 is wound in a reverse direction within the hub B' to that in which the spring 7 is wound in the crank-hanger, and such reverse winding is necessitated by the fact that whereas the driving-pulley A is driven by the crank-axle B, acting on the inner end of its spring, the pulley A' is driven by the driving connection 20, acting on the periphery thereof, and hence the thrust on the spring 24 of the rear hub is in a reverse direction to the thrust on the spring 7 and renders necessary the reverse winding of the spring 24 in the rear hub B'. The said hub B' is provided at the end thereof to which said driven pulley A' is secured with an annular recess 25, the inner end of which is closed. This recess reduces somewhat the interior diameter of the hub at this end and necessitates the location of the ball-cup $f'$ and the cone $g'$ outside of the barrel of the hub, as shown. Said cup $f'$ has a threaded portion 26, which screws into the reduced end 27 of the barrel of the hub, and the back side of said cup is provided with the flange 28, adapted to fit over the end of a short hub on the disk 29 of the pulley A'. The said ball-cup has a hole through it for the passage of the axle, as usual, and the cone $g'$ screws onto the end of said axle. The said recess 25 receives the spring 24, whose function is the same as that of spring 7 of the pulley A, and one end engages the hub at the bottom of said recess and the other end engages the said disk 29 of the driven pulley A'. A disk 30 of the same diameter as 29 is fitted over the end of the hub B', as shown, and a ring 31 is interposed between said disks 29 and 30, and suitable screws pass through each disk into said ring to unite said disks, whereby they may turn as one.

In the end of the hub B' a groove 32 is turned to receive the ends of the spokes 33, which are pivoted therein, as shown in Fig. 1. Said spokes pass through suitable apertures 34 in said ring 31, and the extremities of said spokes are pivotally secured to segmental peripheral sections 35, identical with sections 17 of the driving-pulley A and supported in said disks 29 and 30 in identically the same way as said sections 17 are supported in the said pulley A.

The resistance of each of the springs 7 and 24 to torsion is adjusted in proportion to the difference of the leverage existing in the pulleys A and A', whereby power sufficient to impart torsional movement to the spring 7 will also impart torsional movement to spring 24 and both of said pulleys A and A' will act simultaneously, the driving-pulley A contracting its normal diameter and the driven pulley A' expanding its normal diameter.

Considering this invention as applied to bicycles or other motor-vehicles, it is of great advantage in enabling them to surmount the difficulties attendant upon ordinary road travel. The normal resistance to torsion of the springs 7 and 24 is sufficient to permit the vehicle to be driven on level roads in ordinarily good condition without imparting any movement to said springs; but should the vehicle encounter a sandy road or a hill the increased resistance results in the immediate increase of the power applied to the cranks on axle B of the driving-shaft thereof, which causes said springs to yield and permit the action of the parts as hereinbefore described to reduce the diameter of the driving-pulley and increase the diameter of the driven pulley in proportion to the resistance offered to the advance of said vehicle within certain limits, as stated, and when normal conditions of road are again reached and the power applied to drive the vehicle falls below the normal resistance of the spring 7 to torsional movement the said springs then cause a return to normal positions of the parts acting on the peripheries of said driving and driven pulleys.

The flexible driving connection shown and described is not claimed herein in connection with the pulley construction, but is reserved for another application.

Having thus described my invention, what I claim, and desire to secure by Letters Patent, is—

1. A pulley having a radially-movable periphery consisting of suitably-supported segmental sections, supports for said sections, a hub movable rotatably relative to said supports, connections between said hub and said sections, and diagonal to the radii of said hub, a yielding connection between said hub and said supports, whereby the application of rotational force on said hub, in excess of the resisting power of said yielding connection will impart a radial movement to said sections relative to the center of said hub, substantially as described.

2. A pulley comprising a plurality of segmental sections constituting the periphery thereof, a hub, supports for said sections, said supports and said hub having a rotatable movement one relative to the other, connections between said hub and said sections, which connections are diagonal to the radii of said hub, a yielding connection between said supports and said hub, and means for rotating the latter, substantially as described.

3. A pulley having a radially-movable periphery consisting of suitably-supported segmental sections, supports for said sections, a shaft, a hub, said supports and said hub having a rotatable movement one relative to the other, connections between said hub and said sections, and diagonal to the radii of said hub, a yielding connection between said hub and said supports consisting of a coiled spring, one end of which is secured to said shaft and the opposite end of which is secured to said hub, whereby the application of rotational force to said hub in excess of the resistance power of said spring will cause rotational movements of said hub and said support, one relative to the other, substantially as set forth.

4. A driving and a driven pulley having radially-movable peripheries consisting of suitably-supported segmental sections, supports for said sections, hubs movable rotatably relative to said sections, connections between said hubs and said sections, and diagonal to the radii of said hubs, a yielding connection between said hubs and said supports, a flexible power-transmitting member engaging the peripheries of said pulleys, whereby an amount of resistance applied to the peripheries of said pulleys in excess of the resisting power of said yielding connections will cause rotational movements of said hub and the supports for said sections, one relative to the other, and impart radial movements to said sections relative to said hub, substantially as described.

5. In combination with a shaft, a pulley consisting of a hub fixed on and rotating with said shaft, a series of segmental sections constituting the periphery of said pulley, supports for said sections, said supports being rotatable on said shaft relative to said hub, means on said supports for guiding said sections toward and from a common center in lines diagonal to the radii of said pulley, connections between said hub and said sections for maintaining the latter equidistant from the center of the hub, and a yielding connection between said hub and the supports for said peripheral sections, substantially as described.

6. In combination with a shaft, a pulley consisting of a hub secured to said shaft and rotating therewith, spokes pivotally connected by one end to said hub, segmental sections constituting the periphery of said pulley connected pivotally to the opposite ends of said spokes; supports loose on said shaft, whereby said sections are maintained in proper relation relative to a common center, and on which said sections have a radial movement, and a yielding connection between said shaft and said rotatable supports, substantially as described.

7. A pulley having a radially-moving periphery consisting of segmental sections, supports for said sections, a hub rotatable relative to said supports against a yielding resistance, suitable connections between said hub and said peripheral sections, a flexible band on the periphery of said pulley whereby pressure on said segmental sections in excess of said yielding resistance will move those sections, on which said band bears, toward the center of said pulley, substantially as described.

JOHN C. PRATT.

Witnesses:
H. A. CHAPIN,
K. I. CLEMONS.